United States Patent
Kawashima (10) Patent No.: US 7,831,223 B2
(45) Date of Patent: Nov. 9, 2010

(54) AUTOMATIC ADJUSTMENT CIRCUIT FOR AMPLITUDE OF DIFFERENTIAL SIGNAL

(75) Inventor: Yutaka Kawashima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 690 days.

(21) Appl. No.: 11/848,918

(22) Filed: Aug. 31, 2007

(65) Prior Publication Data

US 2008/0057875 A1 Mar. 6, 2008

(30) Foreign Application Priority Data

Sep. 5, 2006 (JP) ............................... 2006-240412

(51) Int. Cl.
*H04B 17/00* (2006.01)
(52) U.S. Cl. ..................... 455/115.2; 455/126
(58) Field of Classification Search ............ None
See application file for complete search history.

(56) References Cited

U.S. PATENT DOCUMENTS

| | | | |
|---|---|---|---|
| 4,724,545 A | 2/1988 | Hamada | |
| 5,787,120 A * | 7/1998 | Louagie et al. | 375/257 |
| 6,653,870 B2 | 11/2003 | Nakada | |
| 7,120,408 B2 * | 10/2006 | Wood | 455/218 |
| 7,282,965 B2 * | 10/2007 | Hatooka et al. | 327/80 |
| 7,302,246 B2 * | 11/2007 | Tseng et al. | 455/232.1 |
| 7,348,808 B2 * | 3/2008 | Moussavi | 327/77 |
| 7,653,367 B2 * | 1/2010 | Song et al. | 455/218 |
| 2005/0135489 A1 * | 6/2005 | Ho et al. | 375/257 |
| 2005/0193275 A1 * | 9/2005 | Gohel | 714/43 |

FOREIGN PATENT DOCUMENTS

JP 2002-344541 11/2002

* cited by examiner

*Primary Examiner*—Matthew D Anderson
*Assistant Examiner*—Gennadiy Tsvey
(74) *Attorney, Agent, or Firm*—Turocy & Watson, LLP (57) ABSTRACT

An automatic adjustment circuit for amplitude of differential signal has a differential signal transceiver that transmits differential signals, an amplitude setting register in which plural setting values for setting amplitude of the differential signals are stored, an amplitude control circuit that controls the amplitude of the differential signals, a pattern generating circuit that outputs a test pattern, a multiplexer, a squelch detection receiver, a test loop-back circuit, a squelch-signal-change-detection expected-value memory that stores an expected value of a change in a squelch signal, a squelch-signal-change detection counter that counts the change in the squelch signal, a comparator that compares the expected value and a count value and outputs a difference value of the values, a comparison result memory that stores the difference value, and a controller.

20 Claims, 7 Drawing Sheets

AUTOMATIC ADJUSTMENT CIRCUIT FOR AMPLITUDE OF DIFFERENTIAL SIGNAL

CROSS-REFERENCE TO RELATED APPLICATION

This application is based upon and claims the benefit of priority from the prior Japanese Patent Application No. 2006-240412, filed on Sep. 5, 2006, the entire contents of which are incorporated herein by reference.

BACKGROUND OF THE INVENTION

1. Field of the Invention

The present invention relates to a small-amplitude serial data transfer technique, and, more specifically to an automatic adjustment circuit for amplitude of differential signal of a circuit in which electric signals used for transmission and reception are differential signals.

2. Background Art

Differential signals used for small-amplitude serial data transfer have small amplitude. A level of the amplitude needs to be within a range set by a standard.

However, when variation occurs because of fluctuation in a process, a temperature, a voltage, and the like of a circuit (LSI) that generates the differential signals, in some case, the level of the amplitude is not within the standard range unless a margin is provided for the level.

In the past, in order to prevent deviation from the standard range, in some cases, there is a circuit having a function that can change differential amplitude according to setting of an internal register.

However, in such cases, in order to discriminate whether an outputted differential amplitude is appropriate, a measurement circuit/device has to be connected to the outside of the circuit (LSI) to measure an amplitude and register setting has to be performed on the basis of a result of the measurement. Therefore, time and labor are required for adjustment.

For example, a conventional squelch circuit of the past amplifies output signals of a differential pair on the basis of an input signal of the differential pair and holds a peak value of the output signal of each of the differential pair in a node, a potential of which is returned to a potential associated with a signal undetected state by a certain time constant. As such a squelch circuit, there is a squelch circuit that compares the potential of the node and a potential of a reference level (see, for example, Japanese Patent Application Laid-Open Publication No. 2002-344541).

Consequently the reception is accurately discriminated even if the input signal of the differential pair is rapid and has very small amplitude.

However, the squelch circuit of the past does not discriminate whether the outputted differential amplitude is appropriate and cannot adjust the amplitude itself of the differential signals.

SUMMARY OF THE INVENTION

According one aspect of the present invention, there is provided: an automatic adjustment circuit for amplitude of differential signal comprising a differential signal transceiver that outputs differential signals according to a pattern of transmission data; an amplitude setting register in which plural setting values for setting amplitude of the differential signals outputted by the differential signal transceiver are stored; an amplitude control circuit that controls, on the basis of the setting value, the amplitude of the differential signals outputted by the differential signal transceiver; a pattern generating circuit that outputs a test pattern for discriminating an output amplitude level of the differential signals; a multiplexer that switches a test pattern outputted by the pattern generating circuit and a pattern of transmission data during a normal operation and outputs the patterns to the differential signal transceiver; a squelch detection receiver that receives the differential signals, compares the amplitude level of the differential signals and a first squelch detection level set as a reference, and outputs a squelch signal according to a result of the comparison; a test loop-back circuit that is capable of causing an output of the differential signal transceiver and an input of the squelch detection receiver to communicate with each other; a squelch-signal-change-detection expected-value memory that stores an expected value of a change in a squelch signal; a squelch-signal-change detection counter that detects a change in the squelch signal and counts the change; a comparator that compares the expected value stored in the squelch-signal-change-detection expected-value memory and a count value counted by the squelch-signal-change detection counter and outputs a difference value; a comparison result memory that stores the difference value; and a controller that controls at least the amplitude setting register, the pattern generating circuit, the test loop-back circuit, the multiplexer, and the comparison result memory, wherein the controller: causes the pattern generating circuit to output the test pattern, causes the multiplexer to output the test pattern by outputting a transmission data switching signal to the multiplexer, causes, according to the setting value stored in the amplitude setting register, the amplitude control circuit to change an output amplitude level of differential signals for test outputted by the differential signal transceiver, causes an output of the differential signal transceiver and an input of the squelch detection receiver to communicate with each other through the test loop-back circuit by outputting a loop-back switching signal to the test loop-back circuit, and transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value stored in the squelch-signal-change-detection expected-value memory and outputs a difference value, the comparison result memory stores the difference value according to the output amplitude level of the differential signal for a test, and the controller extracts, out of the plural setting values stored in the amplitude setting register, the setting value corresponding to the output amplitude level of the differential signals for test, for which the difference value is zero, as a setting value used during the normal operation and specifies the setting value.

According another aspect of the present invention, there is provided a semiconductor device, comprising: an automatic adjustment circuit for amplitude of differential signal comprising a differential signal transceiver that outputs differential signals according to a pattern of transmission data; an amplitude setting register in which plural setting values for setting amplitude of the differential signals outputted by the differential signal transceiver are stored; an amplitude control circuit that controls, on the basis of the setting value, the amplitude of the differential signals outputted by the differential signal transceiver; a pattern generating circuit that outputs a test pattern for discriminating an output amplitude level of the differential signals; a multiplexer that switches a test pattern outputted by the pattern generating circuit and a pattern of transmission data during a normal operation and outputs the patterns to the differential signal transceiver; a squelch detection receiver that receives the differential signals, compares the amplitude level of the differential signals and a first squelch detection level set as a reference, and outputs a squelch signal according to a result of the comparison; a test loop-back circuit that is capable of causing an output of the differential signal transceiver and an input of the squelch detection receiver to communicate with each other; a squelch-signal-change-detection expected-value memory that stores an expected value of a change in a squelch signal; a squelch-signal-change detection counter that detects a change in the squelch signal and counts the change; a comparator that compares the expected value stored in the squelch-signal-change-detection expected-value memory and a count value counted by the squelch-signal-change detection counter and outputs a difference value; a comparison result memory that stores the difference value; and a controller that controls at least the amplitude setting register, the pattern generating circuit, the test loop-back circuit, the multiplexer, and the comparison result memory, wherein the amplitude setting resister includes a nonvolatile memory, the controller: causes the pattern generating circuit to output the test pattern, causes the multiplexer to output the test pattern by outputting a transmission data switching signal to the multiplexer, causes, according to the setting value stored in the amplitude setting register, the amplitude control circuit to change an output amplitude level of differential signals for test outputted by the differential signal transceiver, causes an output of the differential signal transceiver and an input of the squelch detection receiver to communicate with each other through the test loop-back circuit by outputting a loop-back switching signal to the test loop-back circuit, and transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value stored in the squelch-signal-change-detection expected-value memory and outputs a difference value, the comparison result memory stores the difference value according to the output amplitude level of the differential signal for a test, and the controller extracts, out of the plural setting values stored in the amplitude setting register, the setting value corresponding to the output amplitude level of the differential signals for test, for which the difference value is zero, as a setting value used during the normal operation and specifies the setting value.

According further aspect of the present invention, there is provided a semiconductor device, comprising: an automatic adjustment circuit for amplitude of differential signal comprising a differential signal transceiver that outputs differential signals according to a pattern of transmission data; an amplitude setting register in which plural setting values for setting amplitude of the differential signals outputted by the differential signal transceiver are stored; an amplitude control circuit that controls, on the basis of the setting value, the amplitude of the differential signals outputted by the differential signal transceiver; a pattern generating circuit that outputs a test pattern for discriminating an output amplitude level of the differential signals; a multiplexer that switches a test pattern outputted by the pattern generating circuit and a pattern of transmission data during a normal operation and outputs the patterns to the differential signal transceiver; a squelch detection receiver that receives the differential signals, compares the amplitude level of the differential signals and a first squelch detection level set as a reference, and outputs a squelch signal according to a result of the comparison; a test loop-back circuit that is capable of causing an output of the differential signal transceiver and an input of the squelch detection receiver to communicate with each other; a squelch-signal-change-detection expected-value memory that stores an expected value of a change in a squelch signal; a squelch-signal-change detection counter that detects a change in the squelch signal and counts the change; a comparator that compares the expected value stored in the squelch-signal-change-detection expected-value memory and a count value counted by the squelch-signal-change detection counter and outputs a difference value; a comparison result memory that stores the difference value; and a controller that controls at least the amplitude setting register, the pattern generating circuit, the test loop-back circuit, the multiplexer, and the comparison result memory, wherein the amplitude setting resister includes a fuse element or a flash memory, the controller: causes the pattern generating circuit to output the test pattern, causes the multiplexer to output the test pattern by outputting a transmission data switching signal to the multiplexer, causes, according to the setting value stored in the amplitude setting register, the amplitude control circuit to change an output amplitude level of differential signals for test outputted by the differential signal transceiver, causes an output of the differential signal transceiver and an input of the squelch detection receiver to communicate with each other through the test loop-back circuit by outputting a loop-back switching signal to the test loop-back circuit, and transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value stored in the squelch-signal-change-detection expected-value memory and outputs a difference value, the comparison result memory stores the difference value according to the output amplitude level of the differential signal for a test, and the controller extracts, out of the plural setting values stored in the amplitude setting register, the setting value corresponding to the output amplitude level of the differential signals for test, for which the difference value is zero, as a setting value used during the normal operation and specifies the setting value.

DETAILED DESCRIPTION

An automatic adjustment circuit for amplitude of differential signal according to an embodiment of the present invention automatically adjusts, for example, the amplitude of differential signals used for small-amplitude serial data transfer to an appropriate level (a range of amplitude set by a standard) and outputs the amplitude without connecting a measurement device to the outside of the circuit.

Embodiments of the present invention will be hereinafter explained with reference to the accompanying drawings.

First Embodiment

Figure 1:
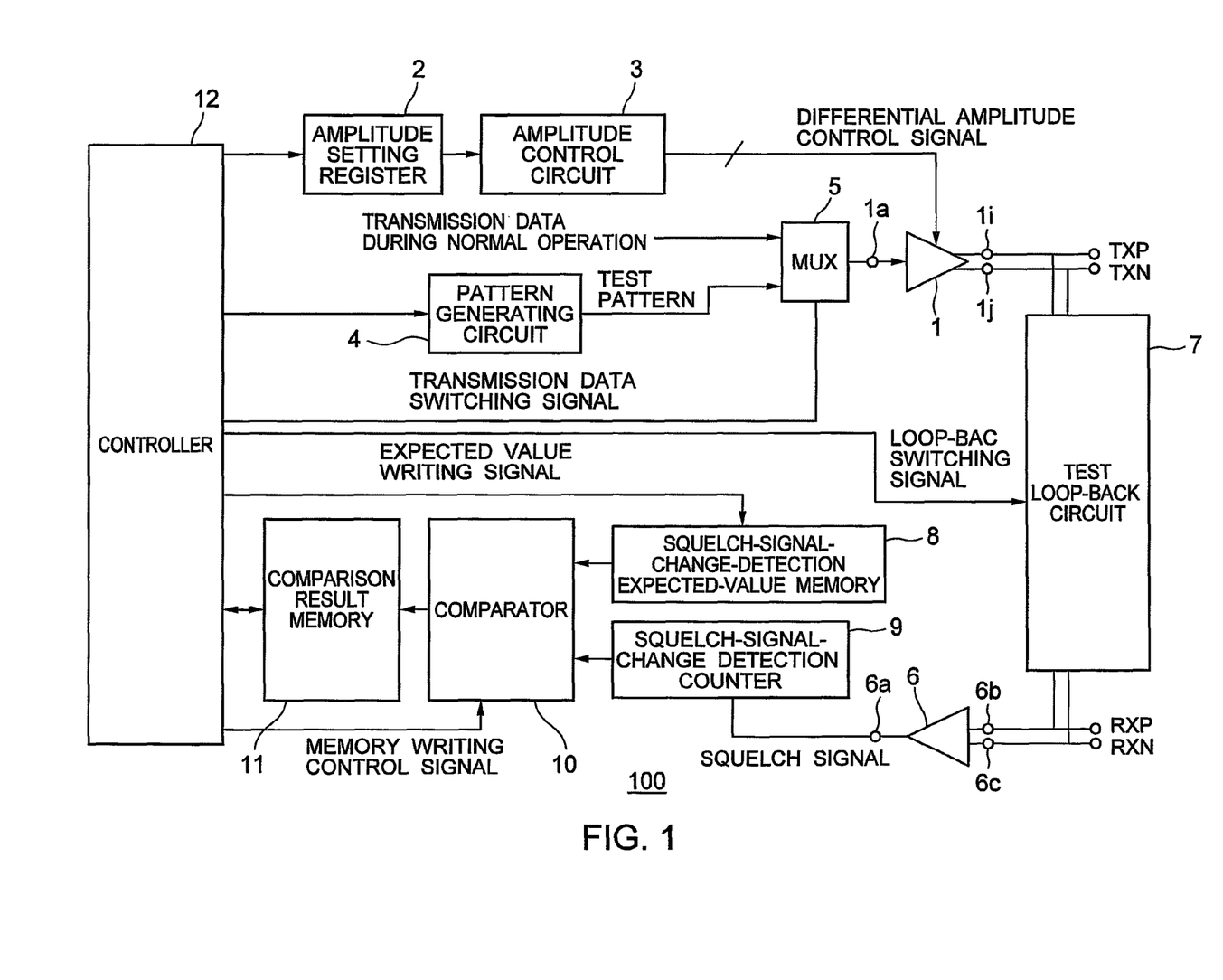
FIG. 1 is a block diagram showing an arrangement of a main part of an automatic adjustment circuit 100 for amplitude of differential signal according to a first embodiment of the present invention.

FIG. 1 is a block diagram showing an arrangement of a main part of an automatic adjustment circuit 100 for amplitude of differential signal according to a first embodiment of the present invention. In FIG. 1, circuits necessary for actual serial data transfer such as a differential signal receiver, which receives differential signals, are present other than those shown in the figure. However, for convenience of explanation, the circuits are not shown in the figure.

Figure 2:
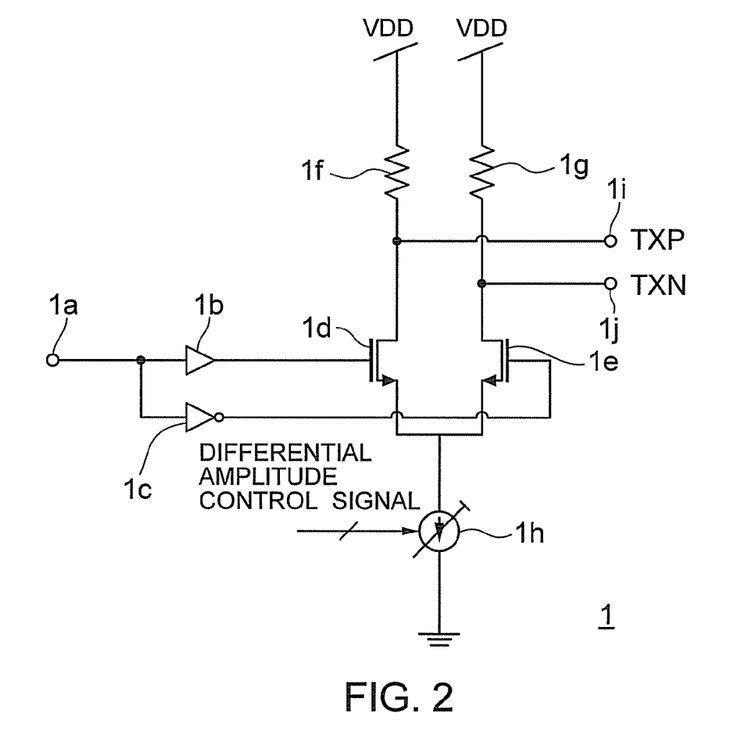
FIG. 2 is a circuit diagram showing an example of an arrangement of a differential signal transceiver of the automatic adjustment circuit 100 for amplitude of differential signal in FIG. 1.
Figure 3:
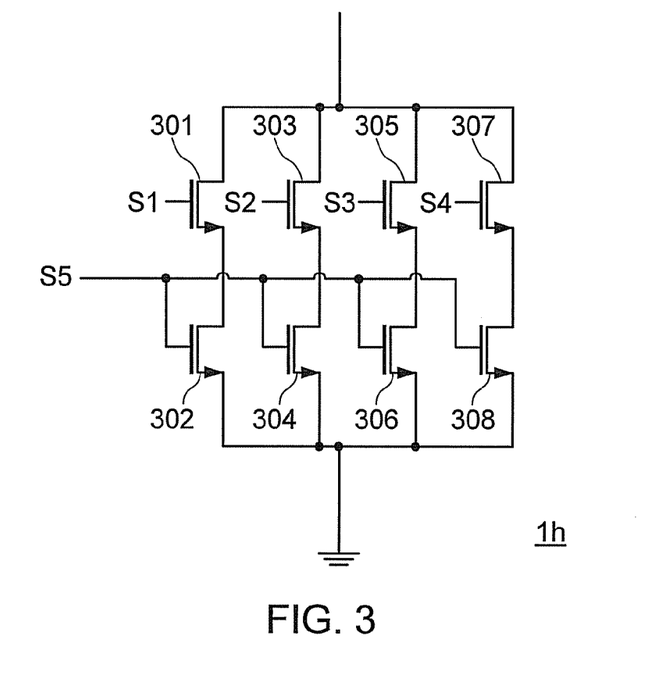
FIG. 3 is a circuit diagram showing an example of an arrangement of a variable current source of the differential signal transceiver in FIG. 2.
Figure 4:
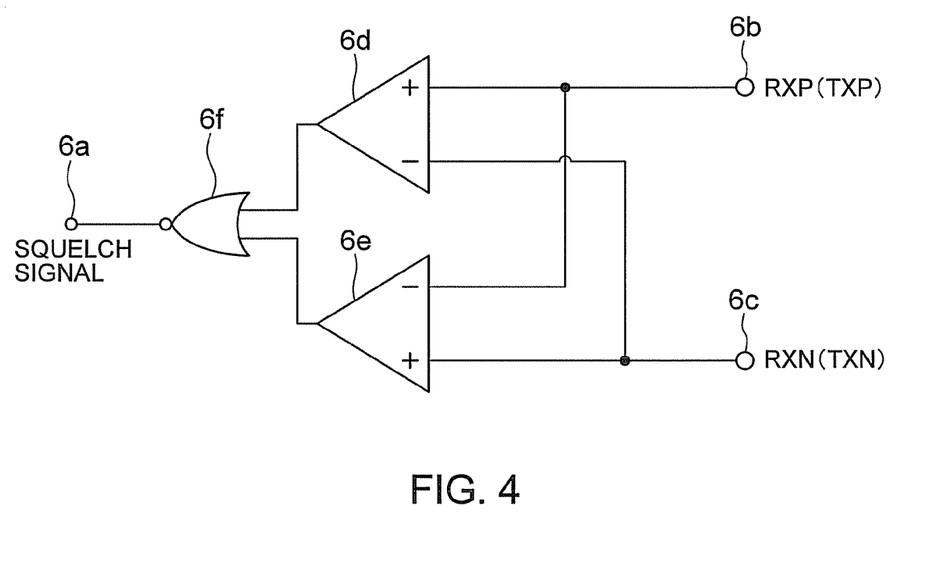
FIG. 4 is a circuit diagram showing an example of an arrangement of a squelch detection receiver of the automatic adjustment circuit 100 for amplitude of differential signal in FIG. 1.
Figure 5:
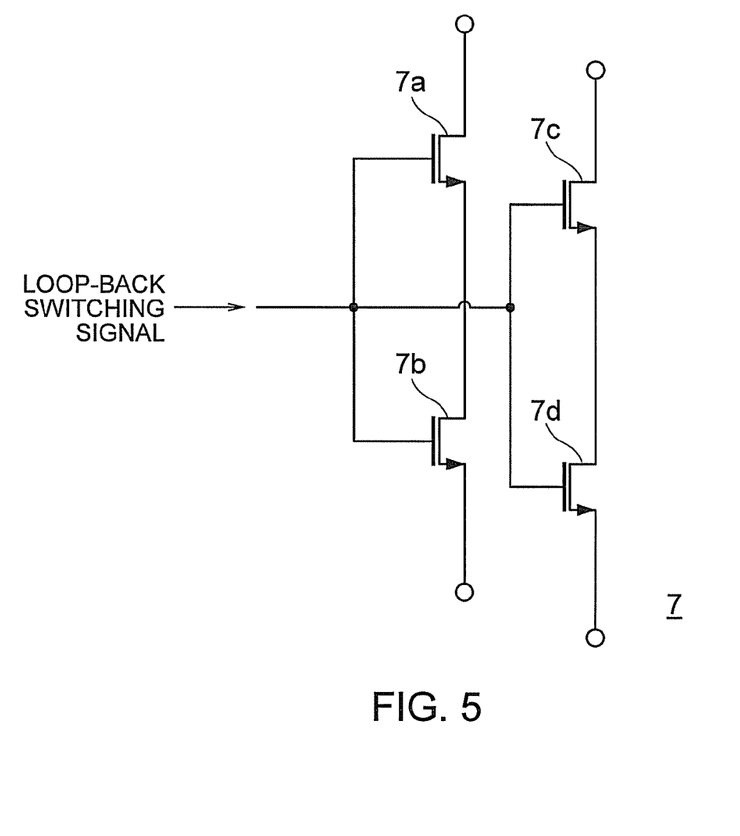
FIG. 5 is a circuit diagram showing an example of an arrangement of a test loop-back circuit of the automatic adjustment circuit 100 for amplitude of differential signal in FIG. 1.

FIG. 2 is a circuit diagram showing an example of an arrangement of a differential signal transceiver of the automatic adjustment circuit 100 for amplitude of differential signal in FIG. 1. FIG. 3 is a circuit diagram showing an example of an arrangement of a variable current source of the differential signal transceiver in FIG. 2. FIG. 4 is a circuit diagram showing an example of an arrangement of a squelch detection receiver of the automatic adjustment circuit 100 for amplitude of differential signal in FIG. 1. FIG. 5 is a circuit diagram showing an example of an arrangement of a test loop-back circuit of the automatic adjustment circuit 100 for amplitude of differential signal in FIG. 1.

As shown in FIG. 1, the automatic adjustment circuit 100 for amplitude of differential signal includes a differential signal transceiver 1 that outputs and transmits differential signals TXN and TXP according to a pattern of transmission data, an amplitude setting register 2 in which plural setting values for setting the amplitude of differential signals outputted by the differential signal transceiver 1 are stored, and an amplitude control circuit 3 that controls, on the basis of the setting values, the amplitude of the differential signals outputted by the differential signal transceiver 1.

The amplitude setting register 2 is a register that performs setting of differential output amplitude of the differential signal transceiver 1. The amplitude setting register 2 can be set from the outside. As a result of automatic adjustment of the differential output amplitude, an appropriate value is written in the amplitude setting register 2 by a controller 12 described later.

The amplitude control circuit 3 converts the setting values stored in the amplitude setting register 2 into differential amplitude control signals for controlling the differential signal transceiver 1.

As shown in FIG. 2, the differential signal transceiver 1 has a buffer 1b, an input of which is connected to an input terminal 1a of the differential signal transceiver 1, an inverter 1c, an input of which is connected to the input terminal 1a, an n-type MOS transistor 1d, a gate of which is connected to an output of the buffer 1b, and an n-type MOS transistor 1e, a gate of which is connected to an output of the inverter 1c and a source of which is connected to a source of the n-type MOS transistor 1d.

The differential signal transceiver 1 has a resistor 1f connected between a drain of the n-type MOS transistor 1d and a power supply VDD, a resistor 1g connected between a drain of the n-type MOS transistor 1e and the power supply VDD, a variable current source 1h connected between the source of the n-type MOS transistor 1d and a ground potential, an output terminal 1i of the differential signal transceiver 1 that is connected to the drain of the n-type MOS transistor 1d and outputs the differential signal TXP, and an output terminal 1j of the differential signal transceiver 1 that is connected to the drain of the n-type MOS transistor 1e and outputs the differential signal TXN.

A current amount of the variable current source 1h is controlled according to a differential amplitude control signal outputted from the amplitude control circuit 3. When an electric current flowing to the variable current source 1h is large, amplitude of differential signal is large. When an electric current flowing to the variable current source 1h is small, amplitude of differential signal is small.

As shown in FIG. 3, the variable current source 1h has, for example, an n-type MOS transistor 301, a drain of which is connected to the source of the n-type MOS transistor 1d, to a gate of which a control signal S1 is inputted, and that functions as a switch, an n-type MOS transistor 302, a drain of which is connected to a source of the n-type MOS transistor 301, to a gate of which a control signal S5 is inputted, and that functions as a transistor resistor, an n-type MOS transistor 303, a drain of which is connected to the source of the n-type MOS transistor 1d, to a gate of which a control signal S2 is inputted, and that functions as a switch, and an n-type MOS transistor 304, a drain of which is connected to a source of the n-type MOS transistor 303, to a gate of which the control signal S5 is inputted, and that functions as a transistor resistor.

Furthermore, the variable current source 1h has an n-type MOS transistor 305, a drain of which is connected to the source of the n-type MOS transistor 1d, to a gate of which the control signal S3 is inputted, and that functions as a switch, an n-type MOS transistor 306, a drain of which is connected to a source of the n-type MOS transistor 305, to a gate of which the control signal S5 is inputted, and that functions as a transistor resistor, an n-type MOS transistor 307, a drain of which is connected to the source of the n-type MOS transistor 1d, to a gate of which the control signal S4 is inputted, and that functions as a switch, and an n-type MOS transistor 308, a drain of which is connected to a source of the n-type MOS transistor 307, to a gate of which the control signal S5 is inputted, and that functions as a transistor resistor.

In this way, the transistor resistors 302, 304, 306, and 308 and the switches 301, 303, 305, and 307 are connected in series, respectively. Plural pairs of the transistor resistors and the switches are connected in parallel.

In FIG. 3, the number of pairs of the transistor resistors and the switches is four. However, the number may be increased or decreased according to a stage where amplitude is controlled.

The control signals S1 to S4 of the switches 301, 303, 305, and 307 are included in the differential amplitude control signal in FIG. 1. This differential amplitude control signal selects a switch to be turned on among the switches 301, 303, 305, and 307. When the number of switches to be turned on is large, a current amount flowing through the variable current source 1h is also large. When the number of switches to be turned on is small, a current amount flowing through the variable current source 1h is also small.

An overall resistance amount of the transistor resistors 302, 304, 306, and 308 is determined by the control signal S5. The control signal 5 may be controlled by the controller 12 in FIG. 1 described later or may be controlled by another control circuit. The control signal S5 may be fixed to a voltage value determined according to a design.

Other resistance elements and the like may be used instead of these transistor resistors.

As shown in FIG. 1, the automatic adjustment circuit 100 for amplitude of differential signal includes a pattern generating circuit 4 that outputs a test pattern for discriminating an output amplitude level of differential signals and a multiplexer 5 that switches the test pattern outputted by the pattern generating circuit 4 and a pattern of transmission data during a normal operation and outputs the patterns to the differential signal transceiver 1.

The pattern generating circuit 4 can have a plurality of the test patterns. The test patterns can be switched by the controller 12 described later. The pattern generating circuit 4 may have only one test pattern. Instead of a form for implementing the test patterns in advance and switching the test patterns, a form of writing the test pattern every time the output amplitude level is discriminated may be adopted.

The automatic adjustment circuit 100 for amplitude of differential signal includes a squelch detection receiver 6 that discriminates whether received differential signals are in an active state or a steady state (a squelch state) and a test loop-back circuit 7 that is capable of causing an output of the differential signal transceiver 1 and an input of the squelch detection receiver 6 to communicate with each other. The squelch state is a state in which a differential signal change indicating a meaningful data transfer state is not present on a differential signal line.

As shown in FIG. 4, the squelch detection receiver 6 has, for example, an output terminal 6a of the squelch detection receiver 6, an input terminal 6b of the squelch detection receiver 6 to which a differential signal RXP is inputted, an input terminal 6c of the squelch detection receiver 6 to which a differential signal RXN is inputted, a first differential amplifier 6d, to an input terminal 6b of which a non-inverting input terminal is connected and to an input terminal 6c of which an inverting input terminal is connected, a second differential amplifier 6e, to an input terminal 6b of which the inverting input terminal is connected and to an input terminal 6c of which the non-inverting input terminal is connected, and a NOR circuit 6f, to an input of which outputs of the first and second differential amplifiers 6d and 6e are connected and an output of which is connected to the output terminal 6a.

The squelch detection receiver 6 receives the differential signal RXP (TXP during a loop-back mode) and RXN (TXN during the loop-back mode), compares an amplitude level of the differential signals and a first squelch detection level set as a reference, and outputs a squelch signal according to a result of the comparison Thresholds of the first and second differential amplifiers 6d and 6e are set equal.

For example, when the amplitude level of the differential signals is higher than the first squelch detection level (exceeds the first squelch detection level), the squelch detection receiver 6 outputs a squelch signal "Low". On the other hand, when the amplitude level of the differential signals is lower than the first squelch detection level (does not exceeds the first squelch detection level), the squelch detection receiver 6 outputs a squelch signal "High". Logics of "High" and "Low" of the squelch signals may be opposite according to setting. The first squelch detection level is determined by an adapted serial data transfer standard such as a USB (Universal Serial Bus). In this way, the signal level of the squelch signal changes according to the squelch state and the active state.

As shown in FIG. 5, the test loop-back circuit 7 has an n-type MOS transistor 7a, a drain of which is connected to an output terminal 1i of the differential signal transceiver 1 and to a gate of which a loop-back switching signal is inputted, an n-type MOS transistor 7b, a drain of which is connected to a source of the n-type MOS transistor 7a and a source of which is connected to the input terminal 6b of the squelch detection receiver 6 and to a gate of which the loop-back switching signal is inputted, an n-type MOS transistor 7c, a drain of which is connected to an output terminal 1j of the differential signal transceiver 1 and to a gate of which the loop-back switching signal is inputted, and an n-type MOS transistor 7d, a drain of which is connected to a source of the n-type MOS transistor 7c, a source of which is connected to the input terminal 6c of the squelch detection receiver 6, and to a gate of which the loop-back switching signal is inputted.

In FIG. 5, there are two n-type MOS transistors that are connected in series and function as switches. However, the number of n-type MOS transistors may be two or more or may be two or less. P-type MOS transistors and other switching elements may be used instead of the n-type MOS transistors.

The loop-back switching signal has a role of turning on and off the n-type MOS transistors 7a to 7d. When the n-type MOS transistors 7a to 7d are off, the test loop-back circuit 7 is in a normal operation mode for shutting down the output of the differential signal transceiver 1 and the input of the squelch detection receiver 6. When the n-type MOS transistors 7a to 7d are on, the test loop-back circuit 7 is in a loop-back mode for causing the output of the differential signal transceiver 1 and the input of the squelch detection receiver 6 to communicate with each other. This loop-back switching signal is outputted from, for example, the controller 12 described later.

As shown in FIG. 1, the automatic adjustment circuit 100 for amplitude of differential signal includes a squelch-signal-change-detection expected-value memory 8 that stores an expected value of a change in a squelch signal, a squelch-signal-change detection counter 9 that detects the change in the squelch signal and counts the change, a comparator 10 that compares the expected value stored in the squelch-signal-change-detection expected-value memory 8 and a count value counted by the squelch-signal-change detection counter 9 and outputs a difference value of the values, and a comparison result memory 11 that stores this difference value.

The automatic adjustment circuit 100 for amplitude of differential signal includes the controller 12 that controls, at least, the amplitude setting register 2, the pattern generating circuit 4, the test loop-back circuit 7, the multiplexer 5, the squelch-signal-change-detection expected-value memory 8, the comparator 10, and the comparison result memory 11.

The squelch-signal-change detection counter 9 counts, for example, the number of times a state of the squelch signal changes to "High" and "Low" and outputs a count value of the count to the comparator 7.

The squelch-signal-change-detection expected value memory 8 stores an expected value of the number of times a state of the squelch signal should change to "High" and "Low" when a test pattern outputted by the pattern generating circuit 4 is loop-back received via the test loop-back circuit 7. The expected value is inputted from the controller 12. Alternatively, plural values are implemented in advance and the controller 12 selects the expected value out of the values. The squelch-signal-change-detection expected-value memory 8 outputs this expected value to the comparator 10.

The comparator 10 compares the count value of the squelch-signal-change detection counter 9 and the expected value in the squelch-signal-change-detection expected-value memory 8 and writes a result of the comparison in the comparison result memory 11.

The controller 12 controls, according to a memory write control signal, in which address of the squelch-signal-change-detection expected-value memory 8 the result is written. Plural detection results can be stored in the squelch-signal-change-detection expected-value memory 8. Therefore, detection results corresponding to the setting values in the amplitude setting register 2 are stored. Storage locations of the detection results are distinguished by addresses designated by the controller 12.

As described above, the controller 12 can write the setting values in the amplitude setting register 2. The controller 12 controls the start and the end of transmission of a test pattern by the pattern generating circuit 4. The controller 12 can perform test pattern selection for the pattern generating circuit 4 or test pattern writing in the pattern generating circuit 4.

As described above, the controller 12 controls the multiplexer 5 to select transmission data transmitted to the differential signal transceiver 1. The controller 12 performs loop-back switching control for the test loop-back circuit 7. The controller 12 performs writing of an expected value in the squelch-signal-change-detection expected-value memory 8 or selection of an implemented expected value.

The controller 12 performs control of a storage destination when a comparison result of the comparator 10 is stored in the comparison result memory 11 according to the memory write control signal. The controller 12 performs readout of the comparison result stored in the comparison result memory 11.

An operation during a test for determining an output amplitude level of differential signals of the automatic adjustment circuit 100 for amplitude of differential signal having the structure described above will be explained.

(1.1) First, the controller 12 performs switching to a test mode according to the following operation.

The controller 12 controls a transmission data switching signal to make it possible to output a test pattern from the pattern generating circuit 4 to the differential signal transceiver 1. Specifically, the controller 12 outputs the transmission data switching signal to the multiplexer 5 and causes the multiplexer 5 to output the test pattern.

The controller 12 controls a loop-back switching signal to set the test loop-back circuit 7 in the loop-back mode. Specifically, the controller 12 outputs the loop-back switching signal to the test loop-back circuit 7 and causes the outputs 1*i* and 1*j* of the differential signal transceiver 1 and the inputs 6*b* and 6*c* of the squelch detection receiver 6 to communicate with each other through the test loop-back circuit 7.

(1.2) Next, the controller 12 stores an expected value of squelch-signal-change detection (e.g., detection of a change in "High" and "Low" described later) corresponding to the test pattern transmitted in the test mode in the squelch-signal-change-detection expected-value memory 8.

Thereafter, the controller 12 causes the pattern generating circuit 4 to start transmission (output) of a test pattern for amplitude adjustment.

The transmitted test pattern is outputted as the differential signals TXP and TXN from the differential signal transceiver 1 and transmitted to the squelch detection receiver 6 through a test loop-back path.

When amplitude is equal to or lower than the squelch detection level in the received test pattern, the squelch detection receiver 6 sets a state of the squelch signal as "High". On the other hand, when amplitude exceeds the squelch detection level, the squelch detection receiver 6 sets a state of the squelch signal as "Low".

Figure 6:
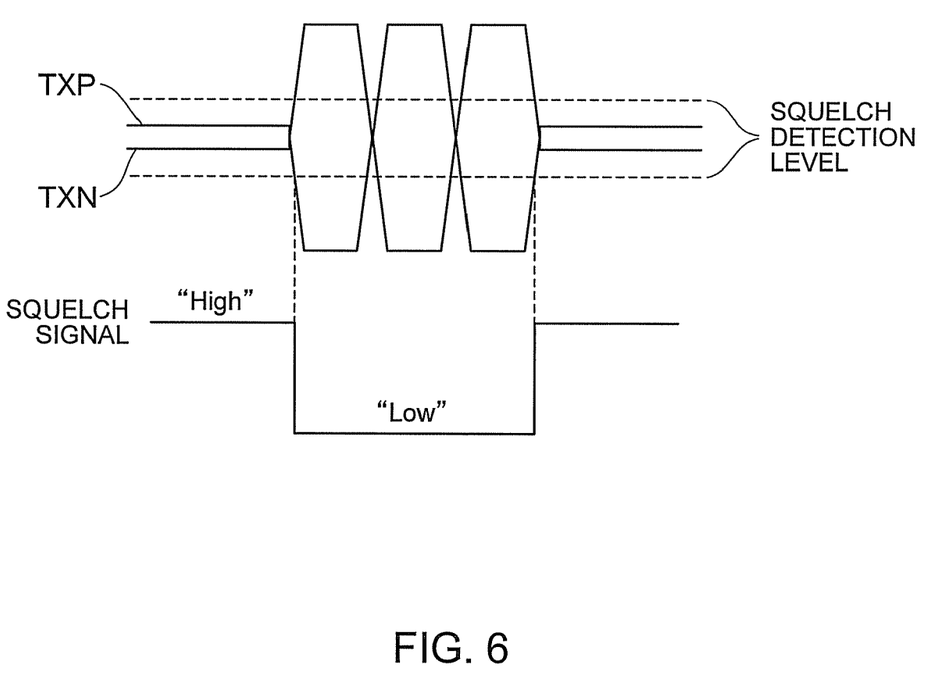
FIG. 6 is a waveform chart showing a relation between a change in differential signals and a state of a squelch signal.

FIG. 6 is a waveform chart showing a relation between a change in differential signals and a state of a squelch signal.

As shown in FIG. 6, a state in which the squelch signal is "High" indicates a state in which the differential signals TXP and TXN are not active (a steady state (a squelch state)). On the other hand, a state in which the squelch signal is "Low" indicates a state in which the differential signals TXP and TXN are active (an active state). When the differential signals are in the active state, i.e., transfer of data is performed, if a differential amplitude exceeding the squelch detection level is obtained, a minimum value of the differential amplitude in the active state is an appropriate value.

The squelch-signal-change detection counter 9 counts the number of times the states "High" and "Low" of the squelch signal have changed from the beginning until the end of the test pattern. Specifically, the squelch-signal-change detection counter 9 counts a change in the squelch signal outputted from the squelch detection receiver 6 according to the input of differential signals for test and outputs a count value of the count to the comparator 10.

The comparator 10 compares an output from the squelch-signal-change detection counter 9 and an output from the squelch-signal-change-detection expected-value memory 8 and writes a difference value of the outputs in the comparison result memory 11. Specifically, the comparator 10 compares this count value and the expected value stored in the squelch-signal-change-detection expected-value memory 8 and outputs the difference value according to an output amplitude level of the differential signals for test.

The controller 12 controls, according to a memory write control signal, when and in which address of the comparison result memory 11 the difference value is written. Consequently, the comparison result memory 11 stores the difference value in association with the output amplitude level of the differential signals for test. Basically, the controller 12 performs the writing of the difference value in the comparison result memory 11 when the controller 12 judges that the transmission of the test pattern to the pattern generating circuit 4 is completed.

(1.3) The controller 12 changes the setting values in the amplitude setting register 2, causes the amplitude control circuit 3 to output a differential amplitude control signal, and slightly changes an output differential amplitude of the differential signal transceiver 1. The change may be in a direction for increasing the amplitude or in a direction for reducing the amplitude.

Specifically, the controller 12 causes, according to the setting values stored in the amplitude setting register 2, the amplitude control circuit 3 to change an output amplitude level of the differential signals for test outputted by the differential signal transceiver 1.

Thereafter, the controller 12 repeats the procedure in (1.2) in a state in which the amplitude of the differential signals outputted by the differential signal transceiver 1 is changed. The output from the comparator 10 is written in the comparison result memory 11. However, the output is written in a location different from the last writing address.

(1.4) The controller 12 repeats the procedures in (1.2) and (1.3) by gradually changing the setting values in the amplitude setting register 2. Consequently, the controller 12 executes all operations for receiving the test pattern in the squelch detection receiver 11 at output differential amplitudes that can be set by the differential signal transceiver 1. The controller 12 stores all outputs (difference values) from the comparator 10 corresponding to the respective differential amplitudes.

The controller 12 specifies an address of data, for which the difference value is zero, out of the difference values stored in the comparison result memory 11 and specifies the setting value in the amplitude setting register 2 corresponding to a value of the address.

Specifically, the controller 12 extracts, as a setting value used during the normal operation, a setting value corresponding to an output amplitude level of the differential signal for a test, for which the difference value is zero, out of the plural setting values stored in the amplitude setting register 2 and specifies the setting value.

After setting the specified setting value in the amplitude setting register 2, the controller 12 outputs a transmission data switching signal and a loop-back switching signal and controls switching from the test mode to the normal operation mode.

If a differential amplitude output, which sufficiently exceeds the squelch detection level and with which the active state can be sufficiently recognized, is outputted from the differential signal transceiver 1, the number of times the state of the squelch signal changes according to the test pattern outputted from the pattern generating circuit 4 is equal to the expected value of the squelch-signal-change-detection expected-value memory 8 and the difference value outputted from the comparator 11 is zero.

Therefore, according to the series of operations, the differential amplitude output in the setting value set in the amplitude setting register 2 becomes differential amplitude automatically adjusted.

After this, a normal operation of serial data transfer from the differential signal transceiver 1 is performed with a setting value fixed to the setting value set in the amplitude setting register 2 by the operation in the test mode.

Consequently, it is possible to automatically adjust a level of differential amplitude simply by performing the adjustment operation in the test mode before the normal operation without connecting a measurement device to the outside of the circuit.

When amplitude deviates from the standard in selection by a tester of an LSI that outputs differential signals, even after the LSI is built in a product, the test mode for automatic adjustment is executed. Consequently, it is possible to automatically adjust the amplitude of differential signals of the LSI.

In executing the test mode, it is possible to execute the test mode without the necessity of specifically connecting a measurement device for differential signals to the outside of the circuit and it is easy to establish a test environment.

Since plural amplitude level of outputted differential signals can be discriminated, it is possible to adjust amplitude concerning a maximum value and a minimum value thereof and further improve a quality of the amplitude of the differential signals.

By constituting the amplitude setting register with a fuse element and a nonvolatile memory such as a flash memory, during mass production, it is also possible to ship products after executing the test mode and setting amplitudes to an appropriate value.

As described above, in the automatic adjustment circuit for amplitude of differential signal according to this embodiment, it is possible to automatically adjust the amplitude of differential signals without requiring an external measurement device.

Second Embodiment

In the first embodiment, the squelch detection receiver outputs a squelch signal on the basis of one squelch detection level.

In a second embodiment of the present invention, a squelch detection receiver outputs a squelch signal on the basis of plural squelch detection levels.

Figure 7:
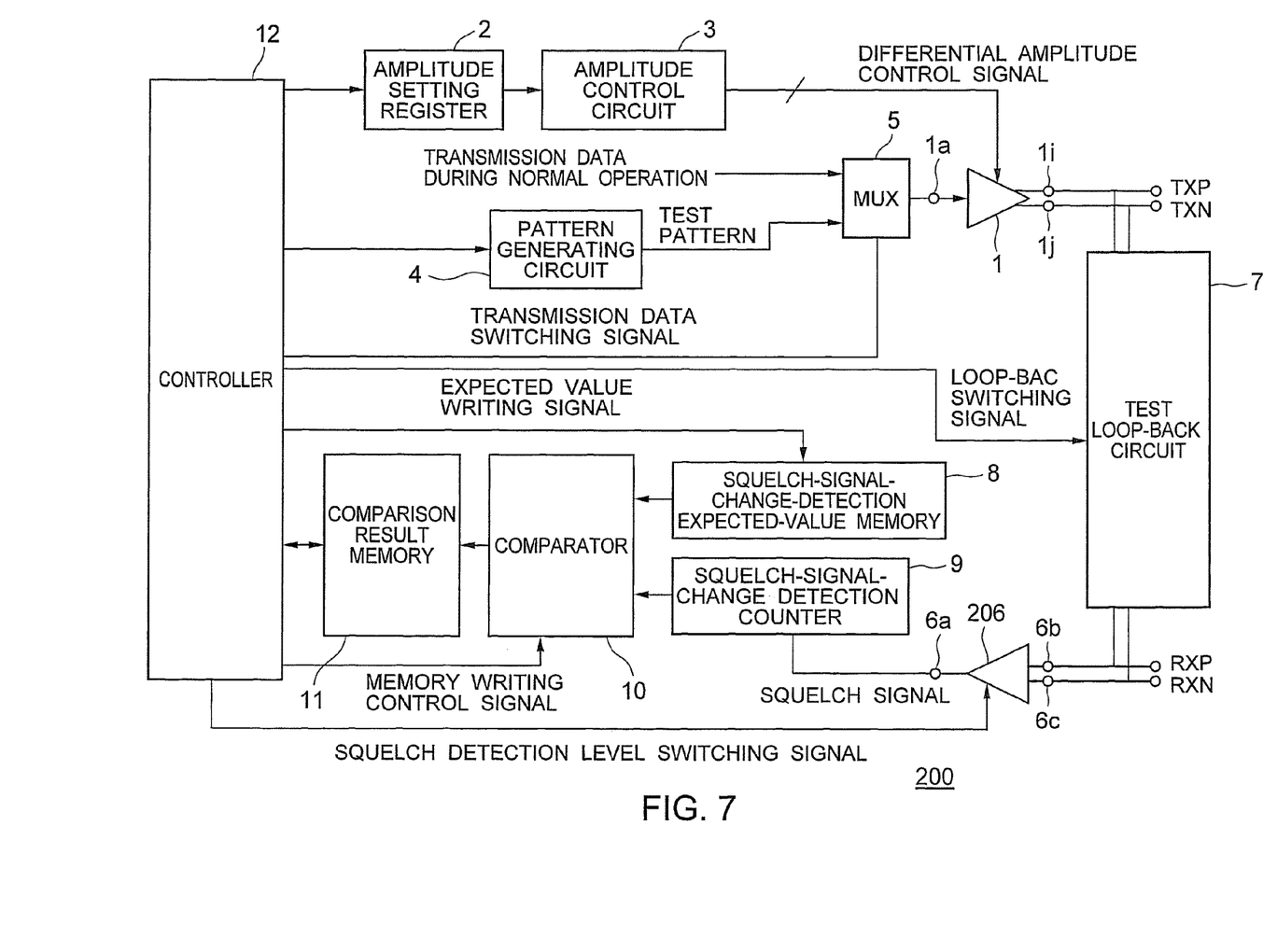
FIG. 7 is a block diagram showing an arrangement of a main part of an automatic adjustment circuit 200 for amplitude of differential signal according to a second embodiment of the present invention.
Figure 8:
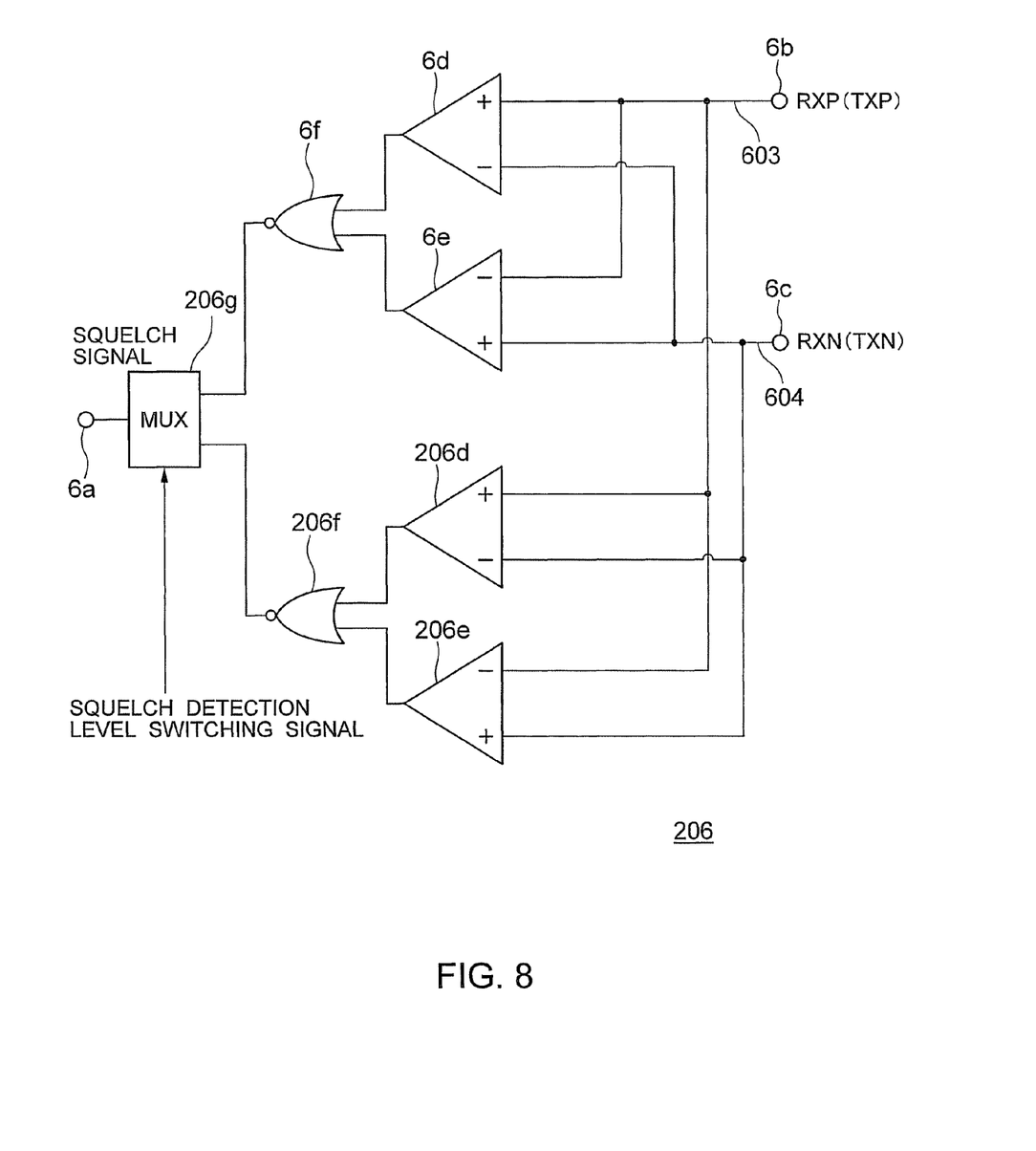
FIG. 8 is a circuit diagram showing an example of an arrangement of a squelch detection receiver of the automatic adjustment circuit 200 for amplitude of differential signal in FIG. 7.

FIG. 7 is a block diagram showing an arrangement of a main part of an automatic adjustment circuit 200 for amplitude of differential signal according to the second embodiment. FIG. 8 is a circuit diagram showing an example of an arrangement of a squelch detection receiver of the automatic adjustment circuit 200 for amplitude of differential signal in FIG. 7.

Components denoted by reference numerals and signs same as those in the first embodiment are components same as those in the first embodiment.

As shown in FIG. 7, a squelch detection receiver 206 switches the squelch detection levels according to a squelch detection level switching signal outputted by the controller 12.

Components other than the squelch detection receiver 206 are the same as those in the first embodiment.

As described above, the squelch detection receiver 206 further has a second squelch detection level different from the first squelch detection level described above. The first squelch detection level is determined according to the serial data transfer standard adopted such as the USB as described above. The second squelch detection level is set to a maximum amplitude level of the serial data transfer standard.

As an example of an arrangement of the squelch detection receiver 206 that is capable of setting plural squelch detection levels, there is a structure in which plural receivers having different squelch detection levels are arranged and one of the receivers is selected.

For example, as shown in FIG. 8, the squelch detection receiver 206 has an output terminal 6a of the squelch detection receiver 206, an input terminal 6b of the squelch detection receiver 206 to which the differential signal RXP is inputted, an input terminal 6c of the squelch detection receiver 206 to which the differential signal RXN is inputted, a first differential amplifier 6d, a non-inverting input terminal of which is connected to the input terminal 6b and an inverting input terminal of which is connected to the input terminal 6c, a second differential amplifier 6e, an inverting terminal of which is connected to the input terminal 6b and a non-inverting terminal of which is connected to the input terminal 6c, and a NOR circuit 6f, to an input of which outputs of the first and second differential amplifiers 6d and 6e are connected.

Moreover, the squelch detection receiver 206 has a third differential amplifier 206d, a non-inverting input terminal of which is connected to the input terminal 6b and an inverting input terminal of which is connected to the input terminal 6c, a fourth differential amplifier 206e, an inverting input terminal of which is connected to the input terminal 6b and a non-inverting input terminal of which is connected to the input terminal 6c, a NOR circuit 206f, to an input of which outputs of the third and fourth differential amplifiers 206d and 206e are connected, and a multiplexer 206g, to an input of which outputs of the NOR circuit 6f and the NOR circuit 206f are connected, an output of which is connected to the output terminal 6a, and that switches the outputs of the NOR circuit 6f and the NOR circuit 206f and outputs the outputs according to a squelch detection level switching signal. Thresholds of the first and second differential amplifiers 6d and 6e are set equal. Thresholds of the third and fourth differential amplifiers 206d and 206e are set equal and set higher than the thresholds of the first and second differential amplifiers 6d and 6e.

The differential signals RXP (TXP during the loop-back mode) and RXN (TXN during the loop-back mode) are inputted to the squelch detection receiver 206. The squelch detection receiver 206 compares an amplitude level of the differential signals and the first squelch detection level set as a reference and outputs a squelch signal according to a result of the comparison.

The squelch detection receiver 206 switches the first squelch detection level and the second squelch detection level according to a squelch detection level switching signal outputted by the controller 12, compares the amplitude level of the differential signals and the second squelch detection level, and outputs a squelch signal according to a result of the comparison.

For example, as in the first embodiment, when the amplitude level of the differential signals is higher than the first squelch detection level (exceeds the first squelch detection level), the squelch detection receiver 206 outputs the squelch signal "Low". On the other hand, when the amplitude level of the differential signals is lower than the first squelch detection level (does not exceed the first squelch detection level), the squelch detection receiver 206 outputs the squelch signal "High".

When the amplitude level of the differential signals is higher than the second squelch detection level (exceeds the second squelch detection level), the squelch detection receiver 206 outputs the squelch signal "Low". On the other hand, when the amplitude level of the differential signals is lower than the second squelch detection level (does not exceed the second squelch detection level), the squelch detection receiver 206 outputs the squelch signal "High". Logics of "High" and "Low" of the squelch signal may be opposite according to setting.

An operation during a test for determining an amplitude level of differential signals of the automatic adjustment circuit 200 for amplitude of differential signal having the structure described above will be explained.

As described above, the first squelch detection level is set to a squelch detection level of an adopted serial data transfer standard. The second squelch detection level is set to a maximum amplitude level of the adopted serial data transfer standard.

Consequently, it is possible to adjust the amplitude of differential signals outputted by the differential signal transceiver 1 to a value between the squelch detection level and the maximum amplitude level.

Figure 9:
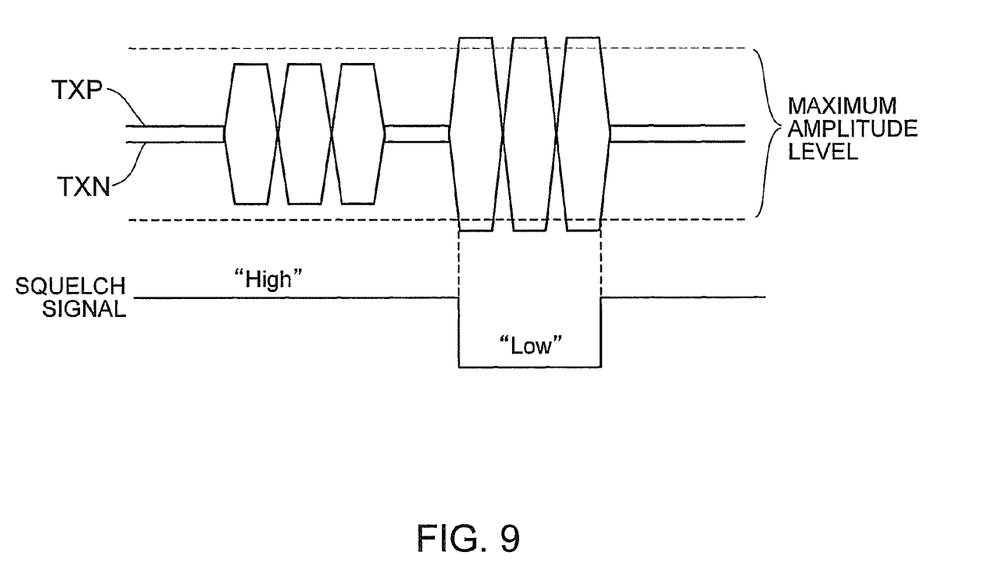
FIG. 9 is a waveform chart showing a relation between a change in differential signals and a state of a squelch signal.

FIG. 9 is a waveform chart showing a relation between a change in differential signals and a state of a squelch signal. As shown in FIG. 9, when the differential amplitude of the differential signals TXP and TXN exceeds the maximum amplitude level, a state of the squelch signal changes from "High" to "Low".

Therefore, for example, when the state of the squelch signal does not change (a count value of change detection is zero) from the beginning until the end of a test pattern transmitted from the pattern generating circuit 4, this indicates that the differential amplitude of the differential signals TXP and TXN does not exceed the maximum amplitude level. In other words, it is possible to confirm that the maximum amplitude is within an appropriate range. Furthermore, an expected value set in the squelch-signal-change-detection expected-value memory 8 in this case is zero.

Specifically, the automatic adjustment circuit 200 for amplitude of differential signal performs the following operations.

(2.1) First, the controller 12 outputs a squelch detection level switching signal and sets a squelch detection level of the squelch detection receiver 206 to the first squelch detection level of the serial data transfer standard.

(2.2) Next, as in the first embodiment, the controller 12 carries out operations same as (1.1) to (1.4).

(2.3) The controller 12 specifies an address of data, for which a difference value is zero, out of the difference values stored in the comparison result memory 11 and specifies plural setting values in the amplitude setting register 2 corresponding to the address.

(2.4) The controller 12 outputs a squelch detection level switching signal and sets the squelch detection level of the squelch detection receiver 206 to the maximum amplitude level (the second squelch detection level) of the serial data transfer standard.

(2.5) The controller 12 sequentially sets the plural setting values in the amplitude setting register 2 specified in (2.3) in the amplitude setting register 2 and carries out operations same as those in the operation procedures (1.1) to (1.4) of the differential amplitude automatic adjustment according to the first embodiment. In other words, the controller 12 limits setting values to the setting values in the amplitude setting register 2 specified in (2.1) to (2.3) and carries out operations same as the operations (1.1) to (1.4) of the automatic adjustment for amplitude of differential signal according to the first embodiment. When the squelch detection level is switched to the second squelch detection level, the controller 12 causes, according to the setting values extracted and specified as setting values used during the normal operation, the amplitude control circuit 3 to change an output amplitude level of a differential signal for a test outputted by the differential signal transceiver 1. As described above, an expected value set in the squelch-signal-change-detection expected-value memory 8 is zero.

(2.6) The controller 12 specifies an address of data, for which the difference value is zero, out of the difference values stored in the comparison result memory 11. The controller 12 sets a setting value in the amplitude setting register 2 corresponding to the address in the amplitude setting register 2. Specifically, the controller 12 extracts a setting value corresponding to an output amplitude level of differential signals for test, for which the difference value is zero, out of setting values extracted and specified as setting values used during the normal operation and specifies the setting value.

After this, the controller 12 outputs a transmission data switching signal and a loop-back switching signal and controls switching from the test mode to the normal operation mode.

According to the series of operations, the amplitude of differential signal corresponding to the setting value set in the amplitude setting register 2 becomes differential amplitude automatically adjusted. In other words, an output of the differential signal transceiver 1 is a differential amplitude output that sufficiently exceeds the first squelch detection level and with which the active state can be sufficiently recognized and a differential amplitude output that does not exceed the maximum amplitude level (the second squelch detection level).

In this embodiment, there are the two squelch detection levels. However, three or more squelch detection levels may be set.

As described above, in the automatic adjustment circuit for amplitude of differential signal according to this embodiment, it is possible to automatically adjust the amplitude of differential signals to be within a desired range without requiring an external measurement device.

What is claimed is:

1. An automatic adjustment circuit for amplitude of differential signal comprising:
   a differential signal transceiver that outputs differential signals according to a pattern of transmission data;
   an amplitude setting register in which plural setting values for setting amplitude of the differential signals outputted by the differential signal transceiver are stored;
   an amplitude control circuit that controls, on the basis of the setting value, the amplitude of the differential signals outputted by the differential signal transceiver;
   a pattern generating circuit that outputs a test pattern for discriminating an output amplitude level of the differential signals;
   a multiplexer that switches a test pattern outputted by the pattern generating circuit and a pattern of transmission data during a normal operation and outputs the patterns to the differential signal transceiver;
   a squelch detection receiver that receives the differential signals, compares the amplitude level of the differential signals and a first squelch detection level set as a reference, and outputs a squelch signal according to a result of the comparison;
   a test loop-back circuit that is capable of causing an output of the differential signal transceiver and an input of the squelch detection receiver to communicate with each other;
   a squelch-signal-change-detection expected-value memory that stores an expected value of a change in a squelch signal;
   a squelch-signal-change detection counter that detects a change in the squelch signal and counts the change;
   a comparator that compares the expected value stored in the squelch-signal-change-detection expected-value memory and a count value counted by the squelch-signal-change detection counter and outputs a difference value;
   a comparison result memory that stores the difference value; and
   a controller that controls at least the amplitude setting register, the pattern generating circuit, the test loop-back circuit, the multiplexer, and the comparison result memory, wherein
   the controller:
      causes the pattern generating circuit to output the test pattern,
      causes the multiplexer to output the test pattern by outputting a transmission data switching signal to the multiplexer,
      causes, according to the setting value stored in the amplitude setting register, the amplitude control circuit to change an output amplitude level of differential signals for test outputted by the differential signal transceiver,
      causes an output of the differential signal transceiver and an input of the squelch detection receiver to communicate with each other through the test loop-back circuit by outputting a loop-back switching signal to the test loop-back circuit, and
      transmits the differential signals for test from the output of the differential signal transceiver to the input of the squelch detection receiver,
   the squelch-signal-change detection counter counts a change in the squelch signal outputted from the squelch detection receiver according to input of the differential signals for test,
   the comparator compares, according to the output amplitude level of the differential signals for test, a count value of the count and the expected value stored in the squelch-signal-change-detection expected-value memory and outputs a difference value,
   the comparison result memory stores the difference value according to the output amplitude level of the differential signal for a test, and
   the controller extracts, out of the plural setting values stored in the amplitude setting register, the setting value corresponding to the output amplitude level of the differential signals for test, for which the difference value is zero, as a setting value used during the normal operation and specifies the setting value.

2. The automatic adjustment circuit for amplitude of differential signal according to claim 1, wherein the squelch detection receiver further has a second squelch detection level different from the first squelch detection level, switches the first squelch detection level and the second squelch detection level according to a squelch detection level switching signal outputted by the controller, compares the amplitude level of the differential signals and the second squelch detection level, and outputs a squelch signal according to a result of the comparison.

3. The automatic adjustment circuit for amplitude of differential signal according to claim 2, wherein
   the first squelch detection level is a squelch detection level of an adopted serial data transfer standard and the second squelch detection level is a maximum amplitude level of the serial data transfer standard,
   when the squelch detection level is switched to the second squelch detection level, the controller further causes, according to the setting value extracted and specified as the setting value used during the normal operation, the amplitude control circuit to change the output amplitude level of the differential signals for test outputted by the differential signal transceiver, outputs a loop-back switching signal to the test loop-back circuit, causes the output of the differential signal transceiver and the input of the squelch detection transceiver to communicate with each other through the test loop-back circuit, and transmits the differential signals for test from the output of the differential signal transceiver to the input of the squelch detection receiver,
   the squelch-signal-change detection counter counts a change in the squelch signal outputted from the squelch detection receiver according to input of the differential signals for test,
   the comparator compares, according to the output amplitude level of the differential signals for test, a count value of the count and the expected value set to zero and stored in the squelch-signal-change-detection expected value memory and outputs a difference value, the comparison result memory stores the difference value in association with the output amplitude level of the differential signals for test, and the controller further extracts the setting value corresponding to the output amplitude level of the differential signals for test, for which the difference value is zero, out of the setting values extracted and specified as the setting value used during the normal operation and specifies the setting value.

4. The automatic adjustment circuit for amplitude of differential signal according to claim 1, wherein the differential signal transceiver has an input terminal which is connected to a output of the multiplexer a buffer which has an input connected to the input terminal, a first inverter which has an input connected to the input terminal, a first MOS transistor which has a gate connected to a output of the buffer, a second MOS transistor which has a source connected to a source of the first MOS transistor and has a conductivity type which is the same as a conductivity type of the first MOS transistor, a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

5. The automatic adjustment circuit for amplitude of differential signal according to claim 2, wherein the differential signal transceiver has an input terminal which is connected to a output of the multiplexer a buffer which has an input connected to the input terminal, a first inverter which has an input connected to the input terminal, a first MOS transistor which has a gate connected to a output of the buffer, a second MOS transistor which has a source connected to a source of the first MOS transistor and has a conductivity type which is the same as a conductivity type of the first MOS transistor, a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

6. The automatic adjustment circuit for amplitude of differential signal according to claim 3, wherein the differential signal transceiver has an input terminal which is connected to a output of the multiplexer a buffer which has an input connected to the input terminal, a first inverter which has an input connected to the input terminal, a first MOS transistor which has a gate connected to a output of the buffer, a second MOS transistor which has a source connected to a source of the first MOS transistor and has a conductivity type which is the same as a conductivity type of the first MOS transistor, a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

7. The automatic adjustment circuit for amplitude of differential signal according to claim 4, wherein a current amount of the variable current source is controlled according to a differential amplitude control signal outputted from the amplitude control circuit.

8. An automatic adjustment circuit for amplitude of differential signal comprising:

a differential signal transceiver that outputs differential signals according to a pattern of transmission data;

an amplitude setting register in which plural setting values for setting amplitude of the differential signals outputted by the differential signal transceiver are stored;

an amplitude control circuit that controls, on the basis of the setting value, the amplitude of the differential signals outputted by the differential signal transceiver;

a pattern generating circuit that outputs a test pattern for discriminating an output amplitude level of the differential signals;

a multiplexer that switches a test pattern outputted by the pattern generating circuit and a pattern of transmission data during a normal operation and outputs the patterns to the differential signal transceiver;

a squelch detection receiver that receives the differential signals, compares the amplitude level of the differential signals and a first squelch detection level set as a reference, and outputs a squelch signal according to a result of the comparison;

a test loop-back circuit that is capable of causing an output of the differential signal transceiver and an input of the squelch detection receiver to communicate with each other;

a squelch-signal-change-detection expected-value memory that stores an expected value of a change in a squelch signal;

a squelch-signal-change detection counter that detects a change in the squelch signal and counts the change;

a comparator that compares the expected value stored in the squelch-signal-change-detection expected-value memory and a count value counted by the squelch-signal-change detection counter and outputs a difference value;

a comparison result memory that stores the difference value; and a controller that controls at least the amplitude setting register, the pattern generating circuit, the test loop-back circuit, the multiplexer, and the comparison result memory, wherein the amplitude setting resister includes a nonvolatile memory, the controller:
  causes the pattern generating circuit to output the test pattern,
  causes the multiplexer to output the test pattern by outputting a transmission data switching signal to the multiplexer,
  causes, according to the setting value stored in the amplitude setting register, the amplitude control circuit to change an output amplitude level of differential signals for test outputted by the differential signal transceiver,
  causes an output of the differential signal transceiver and an input of the squelch detection receiver to communicate with each other through the test loop-back circuit by outputting a loop-back switching signal to the test loop-back circuit, and
  transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value stored in the squelch-signal-change-detection expected-value memory and outputs a difference value, the comparison result memory stores the difference value according to the output amplitude level of the differential signal for a test, and the controller extracts, out of the plural setting values stored in the amplitude setting register, the setting value corresponding to the output amplitude level of the differential signals for test, for which the difference value is zero, as a setting value used during the normal operation and specifies the setting value.

9. The automatic adjustment circuit for amplitude of differential signal according to claim 8, wherein the squelch detection receiver further has a second squelch detection level different from the first squelch detection level, switches the first squelch detection level and the second squelch detection level according to a squelch detection level switching signal outputted by the controller, compares the amplitude level of the differential signals and the second squelch detection level, and outputs a squelch signal according to a result of the comparison.

10. The automatic adjustment circuit for amplitude of differential signal according to claim 9, wherein
  the first squelch detection level is a squelch detection level of an adopted serial data transfer standard and the second squelch detection level is a maximum amplitude level of the serial data transfer standard,
  when the squelch detection level is switched to the second squelch detection level, the controller further causes, according to the setting value extracted and specified as the setting value used during the normal operation, the amplitude control circuit to change the output amplitude level of the differential signals for test outputted by the differential signal transceiver, outputs a loop-back switching signal to the test loop-back circuit, causes the output of the differential signal transceiver and the input of the squelch detection transceiver to communicate with each other through the test loop-back circuit, and transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value set to zero and stored in the squelch-signal-change-detection expected value memory and outputs a difference value, the comparison result memory stores the difference value in association with the output amplitude level of the differential signals for test, and the controller further extracts the setting value corresponding to the output amplitude level of the differential signals for test, for which the difference value is zero, out of the setting values extracted and specified as the setting value used during the normal operation and specifies the setting value.

11. The automatic adjustment circuit for amplitude of differential signal according to claim 8, wherein the differential signal transceiver has
  an input terminal which is connected to a output of the multiplexer,
  a buffer which has an input connected to the input terminal,
  a first inverter which has an input connected to the input terminal,
  a first MOS transistor which has a gate connected to a output of the buffer,
  a second MOS transistor which has a source connected to a source of the first MOS transistor and has a conductivity type which is the same as a conductivity type of the first MOS transistor,
  a first resistor which is connected between a drain of the first MOS transistor and a power supply,
  a second resistor which is connected between a drain of the second MOS transistor and the power supply,
  a variable current source which is connected between the source of the first MOS transistor and a ground potential,
  a first output terminal which is connected to the drain of the first MOS transistor and outputs a first differential signal, and
  a second output terminal which is connected to the drain of the second MOS transistor and outputs a second differential signal.

12. The automatic adjustment circuit for amplitude of differential signal according to claim 9, wherein the differential signal transceiver has
  an input terminal which is connected to a output of the multiplexer,
  a buffer which has an input connected to the input terminal,
  a first inverter which has an input connected to the input terminal,
  a first MOS transistor which has a gate connected to a output of the buffer,
  a second MOS transistor which has a source connected to a source of the first MOS transistor and has a conductivity type which is the same as a conductivity type of the first MOS transistor,
  a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

13. The automatic adjustment circuit for amplitude of differential signal according to claim 10, wherein the differential signal transceiver has an input terminal which is connected to a output of the multiplexer, a buffer which has an input connected to the input terminal, a first inverter which has an input connected to the input terminal, a first MOS transistor which has a gate connected to a output of the buffer, a second MOS transistor which has a source connected to a source of the first MOS transistor and has a conductivity type which is the same as a conductivity type of the first MOS transistor, a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

14. The automatic adjustment circuit for amplitude of differential signal according to claim 11, wherein a current amount of the variable current source is controlled according to a differential amplitude control signal outputted from the amplitude control circuit.

15. An automatic adjustment circuit for amplitude of differential signal comprising:

a differential signal transceiver that outputs differential signals according to a pattern of transmission data;

an amplitude setting register in which plural setting values for setting amplitude of the differential signals outputted by the differential signal transceiver are stored;

an amplitude control circuit that controls, on the basis of the setting value, the amplitude of the differential signals outputted by the differential signal transceiver;

a pattern generating circuit that outputs a test pattern for discriminating an output amplitude level of the differential signals;

a multiplexer that switches a test pattern outputted by the pattern generating circuit and a pattern of transmission data during a normal operation and outputs the patterns to the differential signal transceiver;

a squelch detection receiver that receives the differential signals, compares the amplitude level of the differential signals and a first squelch detection level set as a reference, and outputs a squelch signal according to a result of the comparison;

a test loop-back circuit that is capable of causing an output of the differential signal transceiver and an input of the squelch detection receiver to communicate with each other;

a squelch-signal-change-detection expected-value memory that stores an expected value of a change in a squelch signal;

a squelch-signal-change detection counter that detects a change in the squelch signal and counts the change;

a comparator that compares the expected value stored in the squelch-signal-change-detection expected-value memory and a count value counted by the squelch-signal-change detection counter and outputs a difference value;

a comparison result memory that stores the difference value; and a controller that controls at least the amplitude setting register, the pattern generating circuit, the test loop-back circuit, the multiplexer, and the comparison result memory, wherein the amplitude setting resister includes a fuse element or a flash memory, the controller:
causes the pattern generating circuit to output the test pattern, causes the multiplexer to output the test pattern by outputting a transmission data switching signal to the multiplexer, causes, according to the setting value stored in the amplitude setting register, the amplitude control circuit to change an output amplitude level of differential signals for test outputted by the differential signal transceiver, causes an output of the differential signal transceiver and an input of the squelch detection receiver to communicate with each other through the test loop-back circuit by outputting a loop-back switching signal to the test loop-back circuit, and transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value stored in the squelch-signal-change-detection expected-value memory and outputs a difference value, the comparison result memory stores the difference value according to the output amplitude level of the differential signal for a test, and the controller extracts, out of the plural setting values stored in the amplitude setting register, the setting value corresponding to the output amplitude level of the differential signals for test, for which the difference value is zero, as a setting value used during the normal operation and specifies the setting value.

16. The automatic adjustment circuit for amplitude of differential signal according to claim 15, wherein the squelch detection receiver further has a second squelch detection level different from the first squelch detection level, switches the first squelch detection level and the second squelch detection level according to a squelch detection level switching signal outputted by the controller, compares the amplitude level of the differential signals and the second squelch detection level, and outputs a squelch signal according to a result of the comparison.

17. The automatic adjustment circuit for amplitude of differential signal according to claim 16, wherein the first squelch detection level is a squelch detection level of an adopted serial data transfer standard and the second squelch detection level is a maximum amplitude level of the serial data transfer standard, when the squelch detection level is switched to the second squelch detection level, the controller further causes, according to the setting value extracted and specified as the setting value used during the normal operation, the amplitude control circuit to change the output amplitude level of the differential signals for test outputted by the differential signal transceiver, outputs a loop-back switching signal to the test loop-back circuit, causes the output of the differential signal transceiver and the input of the squelch detection transceiver to communicate with each other through the test loop-back circuit, and transmits the differential signals for test from the output of the differential signal transceiver to the input of the squelch detection receiver, the squelch-signal-change detection counter counts a change in the squelch signal outputted from the squelch detection receiver according to input of the differential signals for test, the comparator compares, according to the output amplitude level of the differential signals for test, a count value of the count and the expected value set to zero and stored in the squelch-signal-change-detection expected value memory and outputs a difference value, the comparison result memory stores the difference value in association with the output amplitude level of the differential signals for test, and the controller further extracts the setting value corresponding to the output amplitude level of the differential signals for test, for which the difference value is zero, out of the setting values extracted and specified as the setting value used during the normal operation and specifies the setting value.

18. The automatic adjustment circuit for amplitude of differential signal according to claim 15, wherein the differential signal transceiver has an input terminal which is connected to a output of the multiplexer, a buffer which has an input connected to the input terminal, a first inverter which has an input connected to the input terminal, a first MOS transistor which has a gate connected to a output of the buffer, a second MOS transistor which has a source connected to a source of the first MOS transistor and has a conductivity type which is the same as a conductivity type of the first MOS transistor, a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

19. The automatic adjustment circuit for amplitude of differential signal according to claim 16, wherein the differential signal transceiver has an input terminal which is connected to a output of the multiplexer, a buffer which has an input connected to the input terminal, a first inverter which has an input connected to the input terminal, a first MOS transistor which has a gate connected to a output of the buffer, a second MOS transistor which has a source connected to a source of the first MOS transistor and has a conductivity type which is the same as a conductivity type of the first MOS transistor, a first resistor which is connected between a drain of the first MOS transistor and a power supply, a second resistor which is connected between a drain of the second MOS transistor and the power supply, a variable current source which is connected between the source of the first MOS transistor and a ground potential, a first output terminal which is connected to the drain of the first MOS transistor and outputs a first differential signal, and a second output terminal which is connected to the drain of the second MOS transistor and outputs a second differential signal.

20. The automatic adjustment circuit for amplitude of differential signal according to claim 18, wherein a current amount of the variable current source is controlled according to a differential amplitude control signal outputted from the amplitude control circuit.

* * * * *